United States Patent
Ramunno

(10) Patent No.: US 9,440,598 B2
(45) Date of Patent: Sep. 13, 2016

(54) WIRING HARNESS ASSEMBLY FOR VEHICLE INCLUDING SOURCE SPLICE OVERLAY

(71) Applicant: AEES, Inc., Farmington Hills, MI (US)

(72) Inventor: David A. Ramunno, Milford, MI (US)

(73) Assignee: AEES, INC., Farmington Hills, MI (US)

( * ) Notice: Subject to any disclaimer, the term of this patent is extended or adjusted under 35 U.S.C. 154(b) by 0 days.

(21) Appl. No.: 14/538,030

(22) Filed: Nov. 11, 2014

(65) Prior Publication Data

US 2015/0129304 A1 May 14, 2015

Related U.S. Application Data

(60) Provisional application No. 61/902,415, filed on Nov. 11, 2013.

(51) Int. Cl.
*B60R 16/02* (2006.01)

(52) U.S. Cl.
CPC .................... *B60R 16/0207* (2013.01)

(58) Field of Classification Search
CPC .......... B60R 16/0207; B60R 16/0215; B60R 16/023; H01B 7/0045
USPC ....................................................... 174/72 A
See application file for complete search history.

(56) References Cited

U.S. PATENT DOCUMENTS

| | | | | |
|---|---|---|---|---|
| 5,829,129 A * | 11/1998 | Ito | ....................... | B60R 16/0207 174/72 A |
| 6,246,001 B1 * | 6/2001 | Fukui | ..................... | H01R 9/034 174/78 |
| 6,392,148 B1 * | 5/2002 | Ueno | ................... | B60R 16/0215 174/117 F |
| 6,616,463 B1 | 9/2003 | Burnett et al. | | |
| 6,635,824 B1 * | 10/2003 | Oka | ....................... | H01R 9/226 174/72 B |
| 2009/0314511 A1 * | 12/2009 | Hagi | ...................... | H01R 4/726 174/78 |
| 2011/0048762 A1 * | 3/2011 | Sawamura | .......... | B60R 16/0207 174/78 |
| 2015/0229115 A1 * | 8/2015 | George | ................. | H02G 15/117 307/31 |

* cited by examiner

*Primary Examiner* — Timothy Thompson
*Assistant Examiner* — Amol Patel
(74) *Attorney, Agent, or Firm* — Howard & Howard Attorneys PLLC

(57) ABSTRACT

A wiring harness assembly for a vehicle includes wiring harness assembly for a vehicle including a plurality of overlay wiring harnesses, each of the overlay wiring harnesses including a first harness connector with a plurality of first wires, a source splice overlay adapted to be coupled to a source of the vehicle, a second harness connector with a plurality of second wires, and a weld coupling the source splice overlay to the first harness connector and the second harness connector to form a circuit.

11 Claims, 2 Drawing Sheets

WIRING HARNESS ASSEMBLY FOR VEHICLE INCLUDING SOURCE SPLICE OVERLAY

CROSS-REFERENCE TO RELATED APPLICATION(S)

The present invention claims the priority date of co-pending U.S. Provisional Patent Application Ser. No. 61/902,415, filed Nov. 11, 2013.

BACKGROUND OF THE INVENTION

1. Field of the Invention

The present invention relates generally to wiring harnesses for vehicles and, more particularly to, a wiring harness assembly for a vehicle including a source splice overlay.

2. Description of the Related Art

Wiring harnesses are used across multiple vehicles and have different configurations and needs. Typically, a vehicle includes a plurality of overlay wiring harnesses. The overlay wiring harnesses include a first harness connector and a first splice connector. Each of the overlay wiring harnesses also includes a ground wire having a first end and a second end spaced from the first end. The first harness connector is coupled to the first end of the ground wire. The second end of the ground wire is coupled to the first splice connector. The overlay wiring harnesses further include a second harness connector and a second splice connector. The second splice connector is typically connected to a ground of the vehicle. The second splice connector is coupled to the first splice connector of the overlay wiring harnesses by an interconnect wire.

One disadvantage of the above wiring harness assemblies that typically include ground wires in each of the overlay wiring harnesses is increased assembly costs by requiring an assembler to route and connect each ground wire separately to a splice connector. Another disadvantage of the above wiring harness assemblies is that splice connectors are included to couple the second ends of the ground wires to the wires of the second harness connectors resulting in increased part costs by requiring an extra connector. Therefore, there is a need in the art to provide a wiring harness assembly for a vehicle that includes a source splice overlay that eliminates splice connectors and reduces part and assembly costs.

SUMMARY OF THE INVENTION

Accordingly, the present invention provides a wiring harness assembly for a vehicle includes a plurality of overlay wiring harnesses, each of the overlay wiring harnesses including a first harness connector with a plurality of first wires, a source splice overlay adapted to be coupled to a source of the vehicle, a second harness connector with a plurality of second wires, and a weld coupling the source splice overlay to the first harness connector and the second harness connector to form a circuit.

One advantage of the present invention is that a new wiring harness assembly is provided for a vehicle that includes a source splice overlay. Another advantage of the present invention is that the wiring harness assembly includes a source splice overlay that reduces assembly costs by eliminating the need for an assembler to route and connect each source wire such as a ground wire separately. Yet another advantage of the present invention is that the wiring harness assembly includes a source splice overlay that eliminates splice connectors to couple the second ends of the source wires such as ground wires to the second harness connector, reducing part costs by eliminating an extra connector. Still another advantage of the present invention is that the wiring harness assembly removes the individual ground wires from the overlay wiring harnesses and creates a separate source splice overlay that reduces assembly costs by having a single overlay instead of routing each individual ground wire. Still another advantage of the present invention is that the wiring harness assembly couples the second ends of the source wires such as ground wires to the wires of the second harness connector by a weld, reducing part costs by eliminating the need for two splice connectors.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
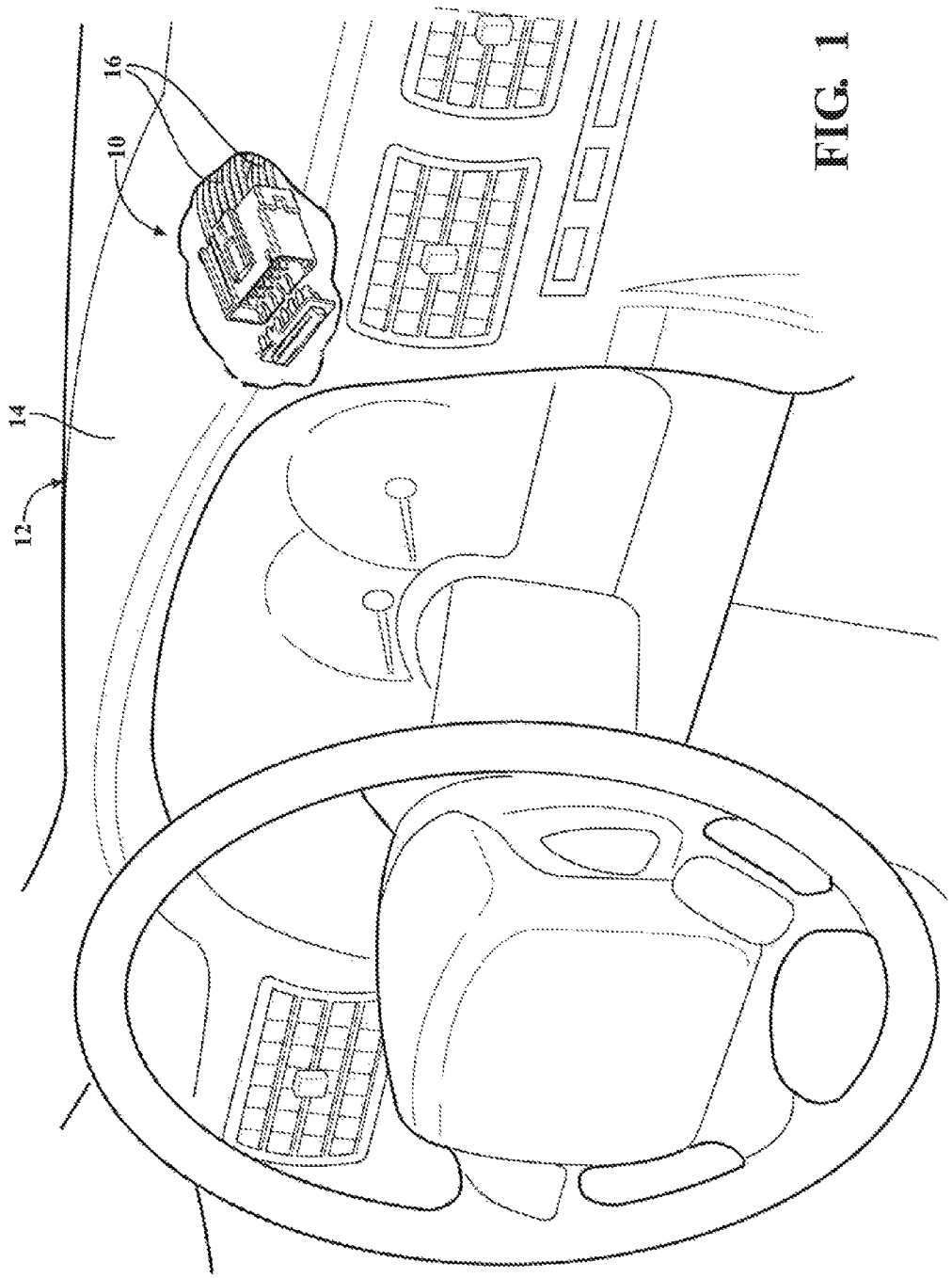
FIG. 1 is a perspective view of a wiring harness assembly illustrated in operational relationship with a vehicle.

As disclosed in FIG. 1, one embodiment of a wiring harness assembly 10 is shown in operational relationship with a vehicle, generally indicated at 12. In one embodiment, the vehicle 12 includes an instrument panel 14 disposed in an occupant compartment thereof. In this embodiment, the wiring harness assembly 10 is used for wires 16 of the instrument panel 14. As will be described in connection with FIG. 2 below, the wires 16 may be connected together by a splice connector, which in turn, is connected to ground of the vehicle 12. It should be appreciated that the wiring harness assembly 10 may be used in other embodiments in the vehicle 12 other than the instrument panel 14 for an ignition circuit and/or illumination circuit.

Figure 2:
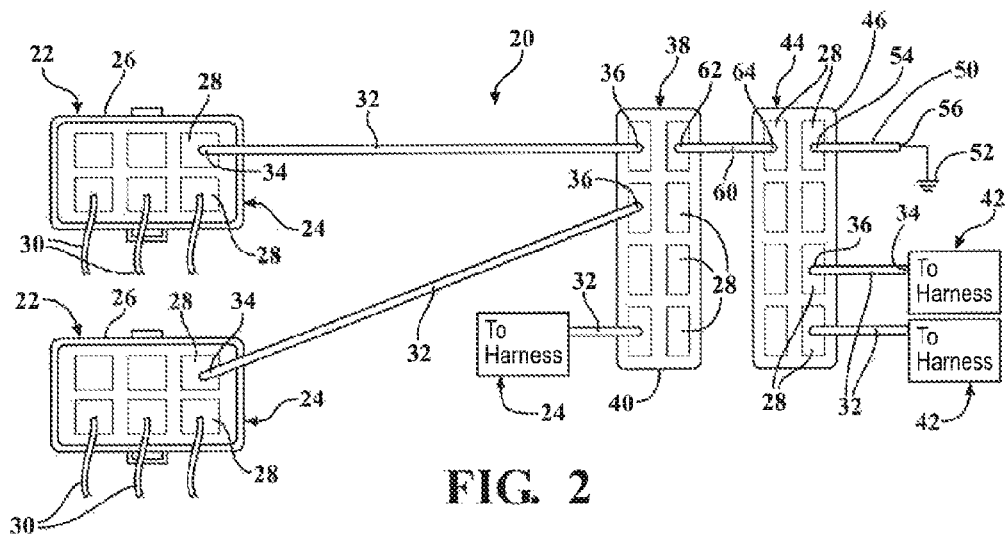
FIG. 2 is a diagrammatic view of an example of a wiring harness assembly including a plurality of ground wires, according to the prior art.

Referring to FIG. 2, an example of a known wiring harness assembly 20, according to the prior art, is shown for the wiring harness assembly 10 of FIG. 1. This known wiring harness assembly 20 generally includes a plurality of overlay wiring harnesses, generally indicate at 22, configured for the instrument panel 14 to electrically connect various components (not shown) of the instrument panel 14 together. Each overlay wiring harness 22 includes a first harness connector, generally indicated at 24. The first harness connector 24 includes a body 26 having a plurality of wire connectors 28 disposed therein and connected to a plurality of wires 30. In one embodiment, the wires 30 may be connected to various components of the instrument panel 14 such as lights, etc. It should be appreciated that one end of each wire 30 is connected to one wire connector 28 and the other end of the wire 30 is connected to a component of the instrument panel 14. It should also be appreciated that the wire connectors 28 are conventional and known in the art.

The overlay wiring harnesses 22 also includes a plurality of ground wires 32. Each of the overlay wiring harnesses 22 includes one ground wire 32 having a first end 34 and a second end 36 spaced from the first end 34. The first end 34 of the ground wire 32 is coupled to the first harness connector 24. In one embodiment, the first end 34 is connected to one of the wire connectors 28 and the wire connector 28 is disposed in the body 26 of the first harness connector 24. It should be appreciated that the ground wire 32 may be connected to the first harness connector 24 by any suitable mechanism.

The wiring harness assembly 20 further includes a first splice connector, generally indicated 38, connected to the ground wires 32. In the embodiment illustrated, the first splice connector 38 includes a body 40 to receive the wire connectors 28. The second end 36 of the ground wire 32 is connected to one of the wire connectors 28 and the wire connector 28 is connected to the first splice connector 38.

Each overlay wiring harness 22 includes a second harness connector, generally indicated at 42. The second harness connector 42 is similar to the first harness connector 24. The second harness connector 42 includes a body (not shown) having a plurality of wire connectors (not shown) disposed therein and connected to a plurality of wires (not shown). In one embodiment, the wires may be connected to various components of the instrument panel 14 such as lights, etc. It should be appreciated that one end of each wire is connected to one wire connector and the other end of the wire is connected to a component of the instrument panel 14. It should also be appreciated that the second harnesses connector 42 may be identical to the first harness connector 24 and is therefore not shown in detail in FIG. 2.

The wiring harness assembly 20 also includes a second splice connector, generally indicated 44, connected to the ground wires 32 of the second harness connectors 42. In the embodiment illustrated, the second splice connector 44 includes a body 46 to receive the wire connectors 28. The first end 34 of the ground wires 32 is coupled to the second harness connector 42. In one embodiment, the first end 34 is connected to one of the wire connectors 28 and the wire connector 28 is disposed in the body of the second harness connector 42. The second end 36 of the ground wire 32 is connected to one of the wire connectors 28 and the wire connector 28 is connected to the second splice connector 44.

As illustrated in FIG. 2, the wiring harness assembly 20 includes a grounding wire 50 connected to ground 52 of the vehicle 12. The grounding wire 50 has a first end 54 connected to one of the wire connectors 28 and a second end 56 connected to the ground 52. The wire connector 28 of the grounding wire 50 is connected to the second splice connector 44. In addition, the wiring harness assembly 20 includes an interconnect wire 60 interconnecting the first splice connector 38 and the second splice connector 44. The interconnect wire 60 has a first end 62 connected to one of the wire connectors 28 that is connected to the first splice connector 38 and a second end 64 connected to another one of the wire connectors 28 that is connected to the second splice connector 44. It should be appreciated that in the wiring harness assembly 20 of FIG. 2, individual ground circuits are added to each overlay wiring harness 22 and interconnected in the main harness (not shown) through the splice connectors 38 and 44. It should also be appreciated that one or more splice connectors 38 and 44 may be used and one end of the ground circuit is connected to the splice connector 38, 44 and the other end to the harness connector 24, 42.

Figure 3:
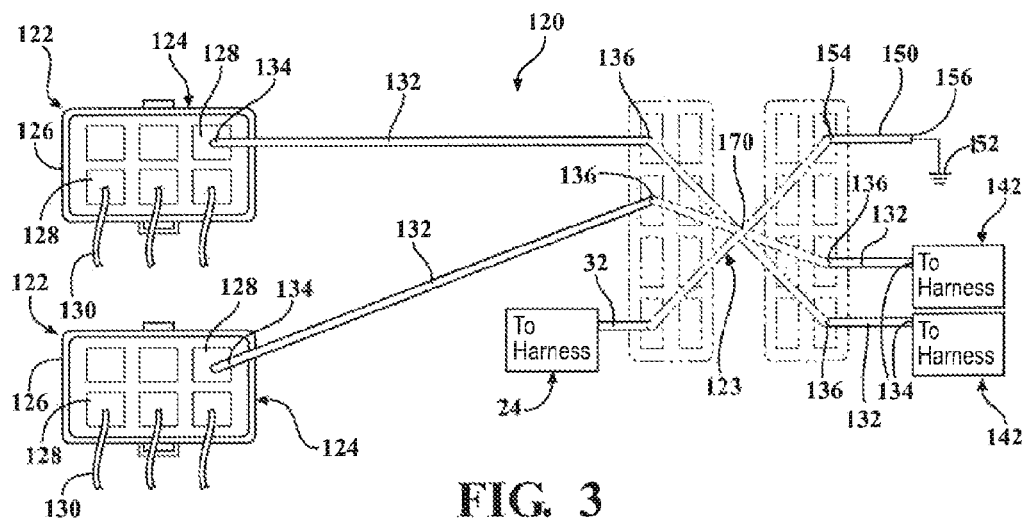
FIG. 3 is a diagrammatic view of one embodiment of a wiring harness assembly including a source splice overlay, according to the present invention.

Referring to FIG. 3, one embodiment of a wiring harness assembly 120, according to the present invention, is shown for the wiring harness assembly 10 of FIG. 1. Like parts of the wiring harness assembly 20 have like reference numerals increased by one hundred (100). The wiring harness assembly 120 includes a plurality of overlay wiring harnesses, generally indicate at 122, configured for the instrument panel 14 to electrically connect various components (not shown) of the instrument panel 14 together and a source splice overlay, generally indicated at 123. Each overlay wiring harness 122 includes a first harness connector, generally indicated at 124. The first harness connector 124 includes a body 126 having a plurality of wire connectors 128 disposed therein and connected to a plurality of wires 130. In one embodiment, the wires 130 may be connected to various components of the instrument panel 14 such as lights, etc. It should be appreciated that one end of each wire 130 is connected to one wire connector 128 and the other end of the wire 130 is connected to a component of the instrument panel 14. It should also be appreciated that in another embodiment, the wires 130 may be connected to an ignition circuit (not shown), illumination circuit (not shown), etc. It should also be appreciated that the wire connector 128 is conventional and known in the art.

The source splice overlay 123 includes a plurality of source wires 132 with each having a first end 134 and a second end 136 spaced from the first end 134. The first end 134 of the source wire 132 is coupled to the first harness connector 124. In one embodiment, the first end 134 is connected to one of the wire connectors 128 and the wire connector 128 is disposed in the body 126 of the first harness connector 124.

Each overlay wiring harness 122 includes a second harness connector, generally indicated at 142. The second harness connector 142 is similar to the first harness connector 124. The second harness connector 142 includes a body (not shown) having a plurality of wire connectors (not shown) disposed therein and connected to a plurality of wires (not shown). In one embodiment, the wires may be connected to various components of the instrument panel 14 such as lights, etc. In another embodiment, the wires may be connected to an ignition circuit (not shown), illumination circuit (not shown), etc. It should be appreciated that one end of each wire is connected to one wire connector and the other end of the wire is connected to a component of the instrument panel 14. It should also be appreciated that the second harnesses connector 142 may be identical to the first harness connector 124 and is therefore not shown in detail in FIG. 3.

The source splice overlay 123 also includes source wires 132 coupled to the second harness connectors 142. The first end 134 of the source wire 132 is coupled to one second harness connector 142. In one embodiment, the first end 134 is connected to one of the wire connectors and the wire connector is disposed in the body of the second harness connector 142.

As illustrated in FIG. 3, the source splice overlay 123 includes a sourcing wire 150 connected to a source 152 of the vehicle 12. In the embodiment illustrated, the source 152 is a ground of the vehicle. In another embodiment, the source 152 may be power. The sourcing wire 150 has a first end 154 and a second end 156 connected to the source 152. The source splice overlay 123 also includes a weld 170 for coupling the second ends 136 of the source wires 132 and second end 154 of the sourcing wire 150 together. In one embodiment, the weld 170 may be an ultrasonic weld. In another embodiment, the weld 170 may be a resistance weld. It should be appreciated that the second ends 136 of the source wires 132 are shown in phantom, but are welded together and to the second end of the sourcing wire 150 such that they are connected to the source 152 to form a circuit.

It should also be appreciated that the second ends 136 of the source wires 132 and the second end 154 of the sourcing wire 150 could be coupled together be any suitable mechanism.

In the wiring harness assembly 120, the individual source wires 132 are cut and inventoried and according to specific vehicle requirements, the individual cut leads are pulled and assembled into the source splice overlay 123. The individual cut leads are welded together with the weld 170. It should be appreciated that the weld 170 will replace the splice connectors. It should also be appreciated that the individual leads of the source wires 132 need only be assembled to the appropriate harness connector 124, 142. It should further be appreciated that the completed wiring harness assembly 120 may be added to a main wiring harness (not shown) as a complete sub-harness.

Accordingly, in the present invention, removing the individual source wires from the overlay wiring harnesses and creating a separate source splice overlay 123 reduces assembly costs by having a single overlay instead of routing each individual source wire such as a ground wire. In the present invention, coupling the second ends of the source wires 123 to the wires of the second harness connector 144 by a weld reduces part costs by eliminating the need for two splice connectors.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A wiring harness assembly for a vehicle comprising:
   a plurality of overlay wiring harnesses, each of said overlay wiring harnesses including a first harness connector with a plurality of first wires, each of said first wires having a connector disposed in said first harness connector;
   a source splice overlay adapted to be coupled to a source of the vehicle;
   a second harness connector with a plurality of second wires, each of said second wires having a connector disposed in said second harness connector; and
   a weld coupling said source splice overlay to said first harness connector and said second harness connector to form a circuit.

2. A wiring harness assembly as set forth in claim 1 wherein said source splice overlay comprises a plurality of source wires and a sourcing wire adapted to be connected to the source of the vehicle.

3. A wiring harness as set forth in claim 2 wherein each of said source wires has a first end and a second end spaced from the first end.

4. A wiring harness assembly as set forth in claim 3 wherein said first end of one of said source wires is coupled to one of said first harness connector and said second harness connector.

5. A wiring harness assembly as set forth in claim 4 wherein said sourcing wire has a first end and a second end.

6. A wiring harness as set forth in claim 5 wherein said second end of said source wires is coupled to said second end of said sourcing wire.

7. A wiring harness assembly as set forth in claim 1 wherein said weld comprises an ultrasonic weld.

8. A wiring harness assembly as set forth in claim 1 wherein said weld comprises a resistance weld.

9. A wiring harness assembly for a vehicle comprising
   a plurality of overlay wiring harnesses, each of said overlay wiring harnesses including a first harness connector with a plurality of first wires, each of said first wires having a connector disposed in said first harness connector;
   a splice overlay coupled to said first harness connector, said splice overlay comprising a plurality of ground wires with each having a first end and a second end spaced from said first end and a grounding wire having a first end adapted to be connected to a ground of the vehicle and a second end spaced from said first end;
   a second harness connector with a plurality of second wires, each of said second wires having a connector disposed in said second harness connector,
   said first end of one of said ground wires is coupled to said first harness connector and said first end of another ground wire being coupled to said second harness connector; and
   a weld coupling said second end of said ground wires to said second end of said grounding wire to form a ground circuit.

10. A wiring harness assembly as set forth in claim 9 wherein said weld an ultrasonic weld.

11. A wiring harness assembly as set forth in claim 9 wherein said weld comprises a resistance weld.

* * * * *